(12) United States Patent
Tseng

(10) Patent No.: US 11,099,775 B2
(45) Date of Patent: Aug. 24, 2021

(54) DATA STORAGE DEVICE AND DATA STORAGE METHOD

(71) Applicant: Silicon Motion, Inc., Jhubei (TW)

(72) Inventor: I-Ling Tseng, Taipei (TW)

(73) Assignee: SILICON MOTION, INC., Jhubei (TW)

( * ) Notice: Subject to any disclaimer, the term of this patent is extended or adjusted under 35 U.S.C. 154(b) by 181 days.

(21) Appl. No.: 15/915,183

(22) Filed: Mar. 8, 2018

(65) Prior Publication Data

US 2018/0364945 A1 Dec. 20, 2018

(30) Foreign Application Priority Data

Jun. 20, 2017 (TW) .................. 106120535

(51) Int. Cl.
*G06F 3/06* (2006.01)
(52) U.S. Cl.
CPC .......... *G06F 3/0659* (2013.01); *G06F 3/0604* (2013.01); *G06F 3/0607* (2013.01); *G06F 3/0635* (2013.01); *G06F 3/0679* (2013.01); *G06F 3/0683* (2013.01)
(58) Field of Classification Search
None
See application file for complete search history.

(56) References Cited

U.S. PATENT DOCUMENTS

| 9,952,991 B1 * | 4/2018 | Bruce | G06F 13/28 |
| 2005/0240687 A1 * | 10/2005 | Hayakawa | G06F 9/4401 710/10 |
| 2010/0250826 A1 * | 9/2010 | Jeddeloh | G06F 13/1684 711/103 |
| 2015/0170716 A1 * | 6/2015 | Lucas | G11C 5/147 365/226 |
| 2015/0356033 A1 * | 12/2015 | Rose | G06F 13/1642 710/310 |
| 2016/0027844 A1 | 1/2016 | Chung et al. | |

(Continued)

FOREIGN PATENT DOCUMENTS

| CN | 103455462 A | 12/2013 |
| CN | 105304669 A | 2/2016 |

(Continued)

*Primary Examiner* — Charles Rones
*Assistant Examiner* — Ryan Dare
(74) *Attorney, Agent, or Firm* — McClure, Qualey & Rodack, LLP

(57) ABSTRACT

A data storage device includes at least one non-volatile memory and a controller with two-layer architecture. The two-layer architecture includes a front end coupled to a host and a back end coupled to the non-volatile memory. The controller includes a command processor and at least one non-volatile memory controller. The command processor is arranged on the front end to communicate with the host, and it schedules the operation of the data storage device based on an external command from the host. The non-volatile memory controller is arranged on the back end, and it controls the non-volatile memory based on the schedule of the command processor. When the non-volatile memory increases, the non-volatile memory controller also increases correspondingly while the amount of command processors remains the same.

18 Claims, 6 Drawing Sheets

(56) References Cited

U.S. PATENT DOCUMENTS

| | | | |
|---|---|---|---|
| 2016/0179375 A1* | 6/2016 | Kirvan | G06F 12/0246 |
| | | | 711/153 |
| 2016/0232103 A1* | 8/2016 | Schmisseur | G06F 12/1408 |
| 2017/0116099 A1* | 4/2017 | Keremane | G06F 3/0629 |

FOREIGN PATENT DOCUMENTS

| | | |
|---|---|---|
| CN | 106462498 A | 2/2017 |
| TW | 201118883 A | 6/2011 |
| TW | 201706850 A | 2/2017 |
| TW | 201710904 A | 3/2017 |
| WO | 2015/200313 A1 | 12/2015 |

\* cited by examiner

DATA STORAGE DEVICE AND DATA STORAGE METHOD

CROSS REFERENCE TO RELATED APPLICATIONS

This Application claims priority of Taiwan Patent Application No. 106120535, filed on Jun. 20, 2017, the entirety of which is incorporated by reference herein.

BACKGROUND OF THE INVENTION

Field of the Invention

The disclosure generally relates to a data storage device and a data storage method, and more particularly, to a data storage device and a data storage method for extension.

Description of the Related Art

Flash memory is a common non-volatile data storage device which electrically performs erasing and programming functions. NAND flash is often utilized in memory cards, USB flash devices, SSD, eMMC, UFS, and so on. However, when a large amount of data needs to be written or a high speed data throughput is required, the original data storage device might not be available, and an additional extension for the data storage device is needed. For example, the above extension includes increasing the storage capacity or the processor. How to rapidly and efficiently extend has become an important issue in the field of data storage. Therefore, a data storage device and a data storage method which provide rapid and convenient extension are needed.

BRIEF SUMMARY OF THE INVENTION

In order to solve the aforementioned problem, the invention proposes a data storage device and a data storage method which provide rapid and convenient extension to meet the requirements for accessing data.

Specifically, the data storage device of the present invention includes at least one non-volatile memory and a controller in a two-layer structure. The two-layer structure comprises a front end coupled to a host and a back end coupled to the non-volatile memory. The data storage device of the present invention could expand corresponding to the increase of the non-volatile memory. No matter how many controllers are increased and expanded on the back end of the data storage device, the arrangement of the front end remains the same. In other words, the amount of each component of the front end does not increase. Therefore, by utilizing the two-layer controller of the present invention, the arrangement of the controller in the back end could be expanded without changing the front end. In addition, the composition and arrangement of each controller is identical, and a new design is not needed for expansion. Therefore, rapid and convenient extension is provided by the data storage device and the data storage method of the present invention.

In one embodiment of the present invention, a data storage device is provided. The data storage device includes at least one non-volatile memory and a controller in a two-layer structure. The two-layer structure comprises a front end coupled to a host and a back end coupled to the non-volatile memory. The controller comprises a command processor and at least one non-volatile memory controller. The command processor is arranged in the front end to communicate with the host and schedules operations of the data storage device according to an external command from the host. The non-volatile memory controller is arranged in the back end and controls the non-volatile memory according to the schedule of the command processor. When the amount of non-volatile memory increases, the amount of non-volatile memory controllers increases correspondingly, and the amount of command processors remains the same.

In another embodiment of the present invention, a data storage method is provided. The data storage method is applied to a data storage device which comprises at least one non-volatile memory and a controller in a two-layer structure. The two-layer structure comprises a front end coupled to a host and a back end coupled to the non-volatile memory. The data storage method comprises communicating with the host, scheduling operations of the data storage device according to an external command from the host; and controlling the non-volatile memory according to the schedule of the command processor; and when the amount of non-volatile memory increases, increasing the amount of non-volatile memory controllers correspondingly, and keeping the amount of command processors the same.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

Figure 1:
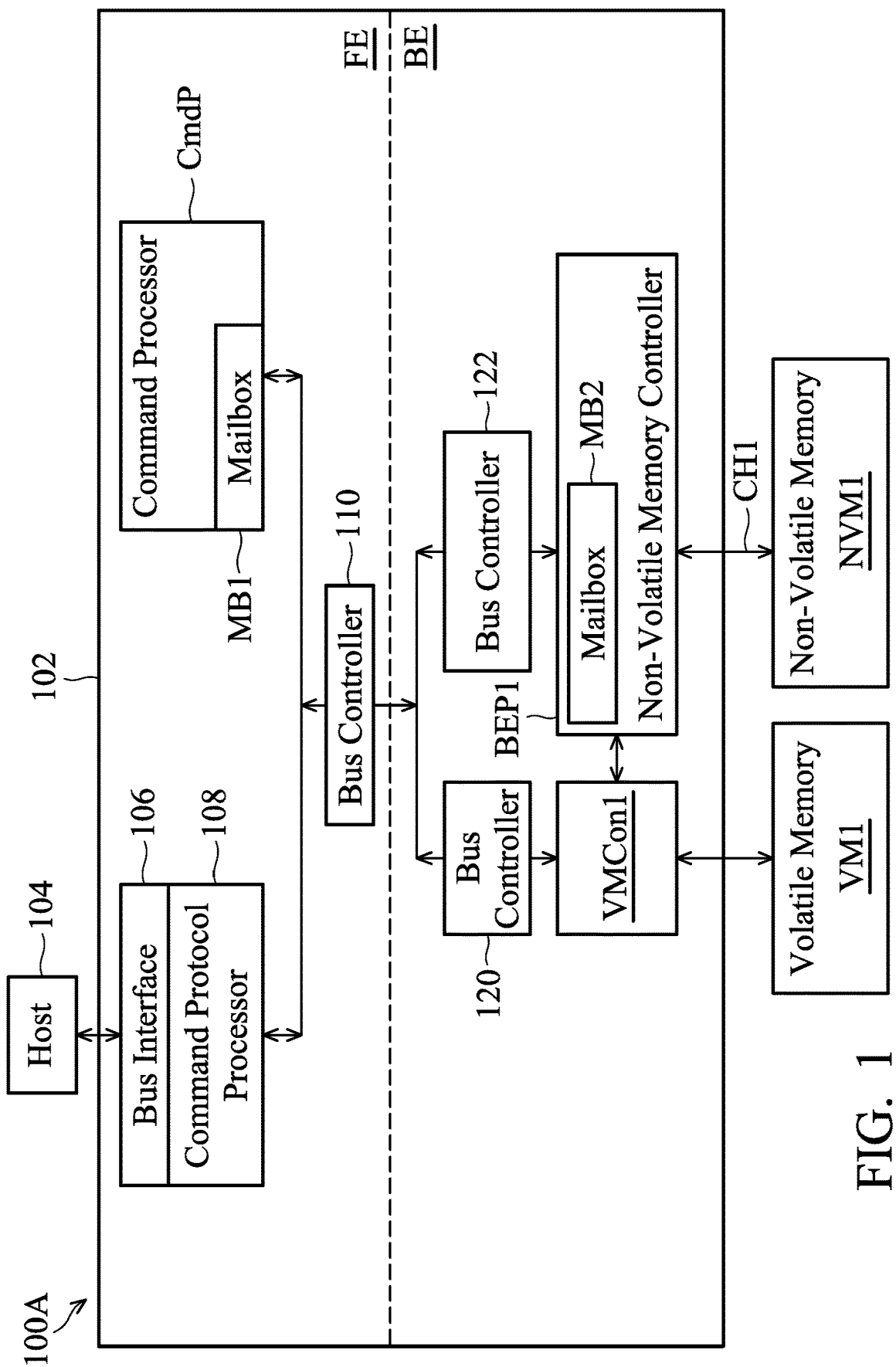
FIG. 1 is a schematic illustrating the data storage device and the host according to an embodiment of the invention.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

To implement a data storage device, a nonvolatile memory, such as flash memory, a magnetoresistive RAM, a ferroelectric RAM, a resistive RAM, a spin transfer torque-RAM (STT-RAM), or the like, is introduced for long-term data retention. To improve the throughput between a host and a data storage device, a two-layer control structure is introduced to implement a controller of a data storage device.

FIG. 1 is a schematic illustrating the data storage device 100 and the host 104 according to an embodiment of the invention. The data storage device 100 complies with the standard of embedded MultiMediaCard (eMMC), Universal Flash Storage (UFS), Non-Volatile Memory express (NVMe), Advanced Technology Attachment (ATA), Parallel ATA(PATA), Serial ATA(SATA), or Small Computer System Interface (SCSI). In the following descriptions, the NVMe will be illustrated as example, but it is not limited. The host 104 could be various kinds of electronic devices such as a cellphone, a tablet computer, a laptop computer, a navigator or a car system. As shown in FIG. 1, the data storage device 100 includes a controller 102, a volatile memory VM1, and a non-volatile memory NVM1. Specifically, the volatile memory VM1 is utilized for temporary storage of data required in the operations of the nonvolatile memory NVM1. The volatile memory VM1 may be built-in or external to the controller 102.

In one embodiment, the controller 102 is further divided into two parts: one at the front end FE and another at the back end BE. The part at the front end FE is responsible for communication between the data storage device 100 and a host 104. The part at the back end BE is responsible for operating the nonvolatile memory NVM1. According to such a two-layer control structure, communication between the host 104 and the data storage device is specifically managed at the front end FE. Thus, the throughput between the host 104 and the data storage device is considerably improved. The complexity of debugging is also reduced, no matter whether it is at the front end FE or at the back end BE.

As shown in FIG. 1, the host 104 is connected to the data storage device 100A via a bus interface 106. The commands complied with the NVMe standard (named as external commands in the following descriptions) which are issued from the host 104 are transmitted to a command processor Cmdp to be scheduled and then transmitted to the back end BE. In other words, the command processor Cmdp communicates with the host 104 through the bus interface 106, and the communication between the data storage device 100A and the host 104 could be simplified. The external commands are scheduled by the command processor Cmdp according to the sequence of setting or receiving priorities.

In one embodiment, the bus interface 106 is an interface of eMMC, UFS or PCIE. The command protocol controller 108 may support an NVMe command protocol, an ATA (advanced technology attachment) command protocol, a PATA (parallel ATA) command protocol, a SATA (serial ATA) command protocol, or an SCSI (small computer system interface). In another embodiment, the command protocol controller 108 has an encryption mechanism to perform encryption for the data transmitted by the host 104. Afterwards, the encrypted data will be transmitted or allocated to the backend BE through the bus controller 110. For example, the above encryption mechanism includes Advanced Encryption Standard (AES) or the RSA encryption algorithm. In addition to the encryption mechanism, the command protocol controller 108 also has inspection mechanism to confirm the accuracy of the data. In a preferred embodiment, the above inspection mechanism is Secure Hash Algorithm (SHA).

In one embodiment, the external commands outputted by the front end FE are transmitted or allocated to the back end BE, and are processed by the components of the back end BE. As shown in FIG. 1, based on the received external commands, the non-volatile memory controller BEP1 operates the volatile memory VM1 through the volatile memory controller VMCon1 to temporarily store the external commands received by the non-volatile memory controller BEP1. Afterwards, the non-volatile memory controller BEP1 transforms the external commands into read/write commands, and executes read/write operations toward the non-volatile memory NVM1 on suitable timing. In another embodiment, the non-volatile memory controller BEP1 transforms the external commands into read/write commands, and temporarily stores the read/write commands on the volatile memory VM1 which is operated by the volatile memory controller VMCon1, and executes read/write operations toward the non-volatile memory NVM1 on suitable timing according to the read/write commands.

The controller 102 in a two-layer control structure uses multiple processors (including the command processor CmdP, the nonvolatile memory controller BEP1, and the volatile memory controller VMCon1. The different processors may communicate with each other according to a multi-processor communication mechanism (for example, a mailbox mechanism) to coordinate the operations between the different processors. In one embodiment, the command processor CmdP includes a mailbox MB1, the nonvolatile memory controller BEP1 includes a mailbox MB2, and the mailboxes MB1 and MB2 has a source/target relationship or develops a source/target relationship in return.

In addition, the data storage device 100A further includes a plurality of bus controllers 110, 120 and 122. As shown in FIG. 1, the bus controller 110 is arranged in the front end FE, and the bus controllers 120 and 122 are arranged in the back end BE. The above mailboxes MB1 and MB2 are associated with the bus controllers 110, 120 and 122 to transmit data and read/write commands, so that the operations of the non-volatile memory controller BEP1, the volatile memory controller VMCon1 and the command processor CmdP could be coordinated. It should be noted that for synchronizing firmware versions of the different processors, the firmware images of the different processors may all be stored in the nonvolatile memory NVM1. The nonvolatile memory controller BEP1 performs a booting/initialization procedure earlier than the command processor CmdP to read the firmware images from the nonvolatile memory NVM1 and transmit the firmware images to the correct processors.

Figure 2:
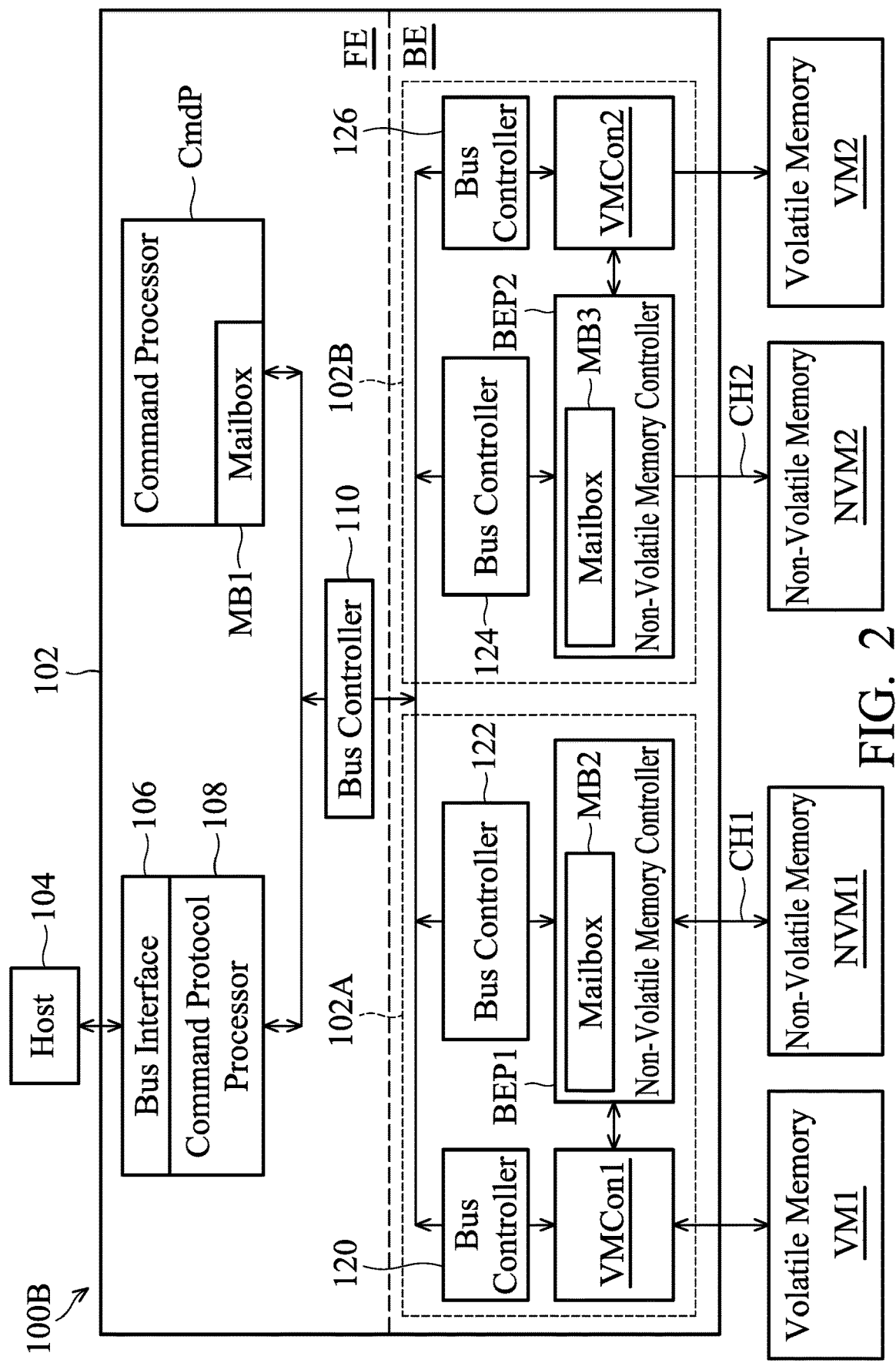
FIG. 2 is a schematic illustrating the data storage device and the host according to another embodiment of the invention.

FIG. 2 is a schematic illustrating the data storage device 100B and the host 104 according to another embodiment of the invention. Because there are two sets of back ends BE, the data storage device 100B could provide twice of the data storage capacity of the data storage device 100A theoretically. Specifically, in the data storage device 100B as shown in FIG. 2, the storage capacities of the non-volatile memory NVM1 and NVM2 are the same or proportional. The data of the embodiment of FIG. 2 is distributed (same or proportional) to the non-volatile memories NVM1 and NVM2. Therefore, the time for accessing data could be effectively reduced to increase the overall performance of the data storage device 100B and proof the availability of high data throughput. In other exemplary embodiments, more non-volatile memories are used. Or, a single nonvolatile memory providing a large storage space is also feasible.

In one embodiment, the non-volatile memories NVM1 and NVM2 are flash. The volatile memories VM1 and VM2 are DRAM. Furthermore, the data storage device 100B includes the volatile memories VM1 and VM2, the non-volatile memory controllers BEP1 and BEP2, the volatile memory controllers VMCon1 and VMCon2, the mailboxes MB2 and MB3, and the bus controllers 120~126 corresponding to the amount of non-volatile memories NVM1 and NVM2.

As shown in FIG. 2, the controller 102A is utilized to control the non-volatile memory NVM1 and the volatile memory VM1, and the controller 102B is utilized to control the non-volatile memory NVM2 and the volatile memory VM2. Specifically, the controller 102A includes two bus controllers 120 and 122, a volatile memory controller VMCon1, and a non-volatile memory controller BEP1 including a mailbox MB2. The controller 102B includes two bus controllers 124 and 126, a volatile memory controller VMCon2, and a non-volatile memory controller BEP2 including a mailbox MB3.

It should be noted that based on the arrangement of the non-volatile memories NVM1 and NVM2, the arrangement of the controller 102B is the same or corresponds to the arrangement of the controller 102A. When the storage capacity of the non-volatile memory NVM2 is identical to the storage capacity of the non-volatile memory NVM1, the arrangement of the controller 102B is identical to the arrangement of the controller 102A. When the storage capacity of the non-volatile memory NVM2 is greater than the storage capacity of the non-volatile memory NVM1, the controller with better performance (the volatile memory controller VMCon2 and non-volatile memory controller BEP2) may be required for the controller 102B to increase the speed of the non-volatile memory NVM2 with greater storage capacity so that its access speed is identical to the access speed of the non-volatile memory NVM1 with a smaller capacity.

In one embodiment, the storage capacity of the non-volatile memory NVM1 is identical to the storage capacity of the non-volatile memory NVM2. In another embodiment, the non-volatile memories NVM1 and NVM2 could be Redundant Array of Independent Disks (RAID) to improve the data reliability and the read/write performance of the data storage device 100B. In the first RAID mode, the non-volatile memories NVM1 and NVM2 are mirror mapping, and the data stored in the non-volatile memory NVM1 is identical to the data stored in the non-volatile memory NVM2. In the second RAID mode, the non-volatile memories NVM1 and NVM2 store data respectively. The non-volatile memory NVM2 not only stores the data, but also stores the RAID parity code of the data stored in the non-volatile memories NVM1 and NVM2. In addition, the RAID parity code could be stored in the non-volatile memory NVM2, or stored in the non-volatile memories NVM1~2 in return. Several RAID modes are provided for users by the data storage device 100B.

In addition, the mailbox MB1 of the present invention receives/stores the information of the non-volatile memory controllers BEP1 and BEP2 (such as the remaining storage capacity and leisure degree of their corresponding memories). The mailboxes MB2~3 receive and store the information of the command processor CmdP respectively to monitor the leisure degree of the non-volatile memories NVM1 and NVM2 periodically. For example, the non-volatile memory controllers BEP1 and BEP2 respectively monitor the leisure degree of the non-volatile memories NVM1 and NVM2 periodically, and transmit the monitored leisure degree immediately to the mailbox MB1 of the front end FE. Accordingly, the command processor CmdP could write the number of external commands to the mailbox MB2 or MB3 of the back end BE based on the information received/stored by the mailbox MB1 in order to distribute the external command to the non-volatile memory NVM1 or NVM2 which is more leisure. Another non-volatile memory which is busier could be prevented from being disturbed so that the data storage device 100 could operate smoothly.

In one embodiment, after receiving the external command transmitted by the host 104, the command processor CmdP converts the external command into a read/write command. The command processor CmdP divides the data corresponding to the external command into a plurality of sub-data, and distributes the read/write command and sub-data to the non-volatile memory controllers BEP1~2 and the volatile memories VM1~2 alternatively. The command processor CmdP reads or writes data for the non-volatile memories NVM1 and NVM2 respectively through the non-volatile memory controllers BEP1~2.

For example, the command processor CmdP divides the data corresponding to the external command into 20 sub-data of numbers 01~20. Afterwards, the command processor CmdP writes the sub-data of odd-number to the non-volatile memory NVM1 through the non-volatile memory controller BEP1, and writes the sub-data of even-number to the non-volatile memory NVM2 through the non-volatile memory controller BEP2. In other words, the non-volatile memory controllers BEP1~2 write the sub-data #01, #02, #03 . . . to the non-volatile memories NVM1~NVM2 in return. It should be noted that the above division amount and the transmission or distribution of data are used for illustration, not for limitation. People skilled in the art divide data with another amount and transmit data in different methods are not beyond the scope and spirit of the present invention.

In one embodiment, if the host 104 does not assign the non-volatile memory NVM1 or NVM2 to be written, the command processor CmdP can transmit or allocate the external commands based on the status of the non-volatile memories NVM1 and NVM2. In one embodiment, by utilizing the mailbox mechanism of the present invention, the command processor CmdP transmits or allocates more external commands and data (sub-data) to whichever non-volatile memory has the larger remaining storage capacity. For example, the command processor CmdP is informed by the mailbox mechanism that the remaining storage capacity of the non-volatile memory NVM1 is three times the remaining storage capacity of the non-volatile memory NVM2. Therefore, the command processor CmdP transmits or allocates 15 sub-data of the 20 sub-data to the non-volatile memory NVM1, and transmits or allocates 5 sub-data of the 20 sub-data to the non-volatile memory NVM2. In other words, the command processor CmdP more data (sub-data) to the non-volatile memory which has larger remaining storage capacity.

In addition, the command processor CmdP schedules the data to be transmitted or allocated to the non-volatile memories NVM1 and NVM2 to improve the efficiency. In other words, the command processor CmdP sequentially transmits or distributes the sub-data #01~03 to the non-volatile memory NVM1, transmits or distributes the sub-data #04 to the non-volatile memory NVM2, transmits or distributes the sub-data #05~07 to the non-volatile memory NVM1, and transmits or distributes the sub-data #08 to the non-volatile memory NVM2. It should be noted that the above difference of remaining storage capacity and the transmission or distribution of data are used for illustration, not for limitation. People skilled in the art transmit data in different methods based on other remaining storage capacity are not beyond the scope and spirit of the present invention.

It should be noted that there are multiple channels between the non-volatile memory NVM1/NVM2 and the non-volatile memory controller BEP1/BEP2, and the non-volatile memory controller BEP1/BEP2 distributes the data for access to the above channels uniformly in order to perform the writing or reading of data with the non-volatile memory NVM1/NVM2.

For example, in the above embodiment, there are 4 channels between the non-volatile memory NVM1 and the non-volatile memory controller BEP1. The sub-data #01~04 are transmitted or distributed to the non-volatile memory NVM1 through the four channels by the non-volatile memory controller BEP1. Compared with transmitting all sub-data #01~04 through one channel, distributing data to each channel uniformly by the present invention could improve the transmission efficiency of data and avoid latency. It should be noted that the above amount of channels and the transmission or distribution of data are used for illustration, not for limitation. People skilled in the art arrange channels of other amounts and allocate data in different methods are not beyond the scope and spirit of the present invention.

In one embodiment, the command processor CmdP is informed that the non-volatile memory NVM1 is in a busy state and the non-volatile memory NVM2 is in a leisure state through the mailbox mechanism. Therefore, the command processor CmdP transmits or distributes more data to the non-volatile memory NVM2 which is more leisure. Similarly, the command processor CmdP schedules the data to write to the non-volatile memories NVM1 and NVM2 alternatively. The data which needs access is distributed to all channels uniformly by the non-volatile memory controller BEP1/BEP2 to execute the writing or reading of data with the non-volatile memories NVM1 and NVM2.

The above embodiments are illustrating the cases that the host 104 does not assign the non-volatile memory to be written. In another embodiment, the command processor CmdP receives the external command from the host 104, and the non-volatile memory NVM1 is assigned to be the storage space for access. The command processor CmdP transmits or distributes the external command to the non-volatile memory controller BEP1 to complete the execution of the external command. In addition, the non-volatile memory controller BEP1 distributes the data to be accessed to all channels in order to improve the transmission efficiency of data.

Figure 3:
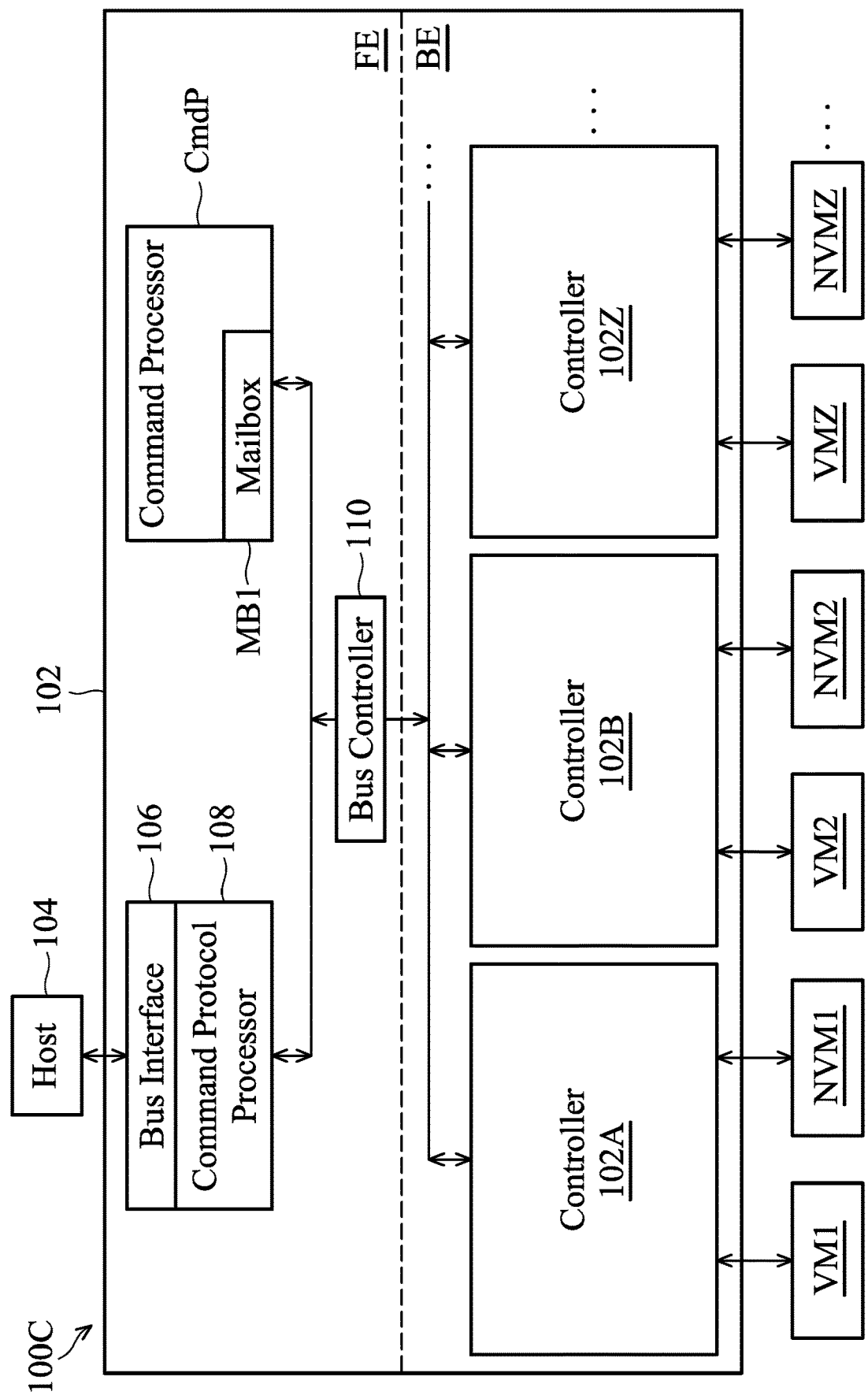
FIG. 3 is a schematic illustrating the extension of the data storage device according to an embodiment of the invention.

FIG. 3 is a schematic illustrating the extension of the data storage device 100C according to an embodiment of the invention. The amount of controllers is corresponding and proportional to the amount of memories (including volatile memory and non-volatile memory). The amount of controllers increases when the amount of memories increases. The amount of controllers, the amount of non-volatile memories and the amount of volatile memories are equaled. In one embodiment, the composition and arrangement of each controller is identical.

Specifically, the command processor CmdP of the front end FE controls and communicates with the multiple controllers 102A-102Z of the back end BE, and it does not directly access the data of the non-volatile memory. The above Z is a positive integer. In other words, the command processor CmdP of the front end FE is utilized to handle the external commands from the host 104 efficiently, and transmits or distributes the external commands and data to different controllers 102A~102Z. The controllers 102A~102Z of back end BE are utilized to manage and communicate with the non-volatile memories NVM1~Z and the volatile memories VM1~Z in order to efficiently allocate channels for reading or writing data.

It should be noted that the amount of back end BE is not directly related to the amount of front end FE. The amount of front end FE is directly related to the bandwidth of the bus interface 106. The amount of back end BE is directly related to the bandwidth of the bus interface 106, the bandwidth of the back end BE and the access speed of the non-volatile memory. The access speed of the non-volatile memory is slower, which is the bottle neck of the system performance of the data storage device 100C. The amount of front end FE is smaller than the amount of back end BE. The amount of back end BE is preferably to be even-times the amount of front end FE. Therefore, by utilizing the two-layer controller 102 of the present invention, the arrangement of the back end BE could be increased to meet the system requirements of the user without changing the arrangement of the front end FE. In addition, the composition and arrangement of the controller of each back end BE is identical. Accordingly, the arrangement for the controller of the back end BE could be easily accomplished to meet the needs of various users. Therefore, a convenient and rapid expansion is provided by the two-layer data storage device 100C and the data storage method of the present invention.

In one embodiment, the amount of non-volatile memories VM1~Z is determined based on the data amount stored in the data storage device 100C, the throughput between the data storage device 100C and the host 104, and the channel amount between the non-volatile memory NVM1~Z and the non-volatile memory controller BEP1~Z. Specifically, the amount of non-volatile memory NVM1~Z is proportional to the data amount stored in the data storage device 100C. When the data amount stored in the data storage device 100C is greater, the amount of non-volatile memory NVM1~Z is greater.

Furthermore, the amount of non-volatile memory NVM1~Z is proportional to the bandwidth of the bus interface 106. When the bandwidth of the bus interface 106 is greater which means there are more external commands to be executed by the data storage device 100C during a fixed period, there is more data which needs writing or reading. Therefore, more non-volatile memories NVM1~Z are needed for the data storage device 100C.

In another embodiment, the amount of non-volatile memories NVM1~Z is inversely proportional to the channel amount between the non-volatile memories NVM1~Z and the non-volatile memory controller BEP1~Z. Generally, the throughput between the data storage device 100C and the host 104, and the throughput of each channel between the non-volatile memories NVM1~Z and the non-volatile memory controller BEP1~Z are fixed. When there are more channels between the non-volatile memories NVM1~Z and the non-volatile memory controller BEP1~Z, more throughput between the data storage device 100C and the host 104 are spent, and the non-volatile memories NVM1~Z which could be arranged decreases.

Figure 4:
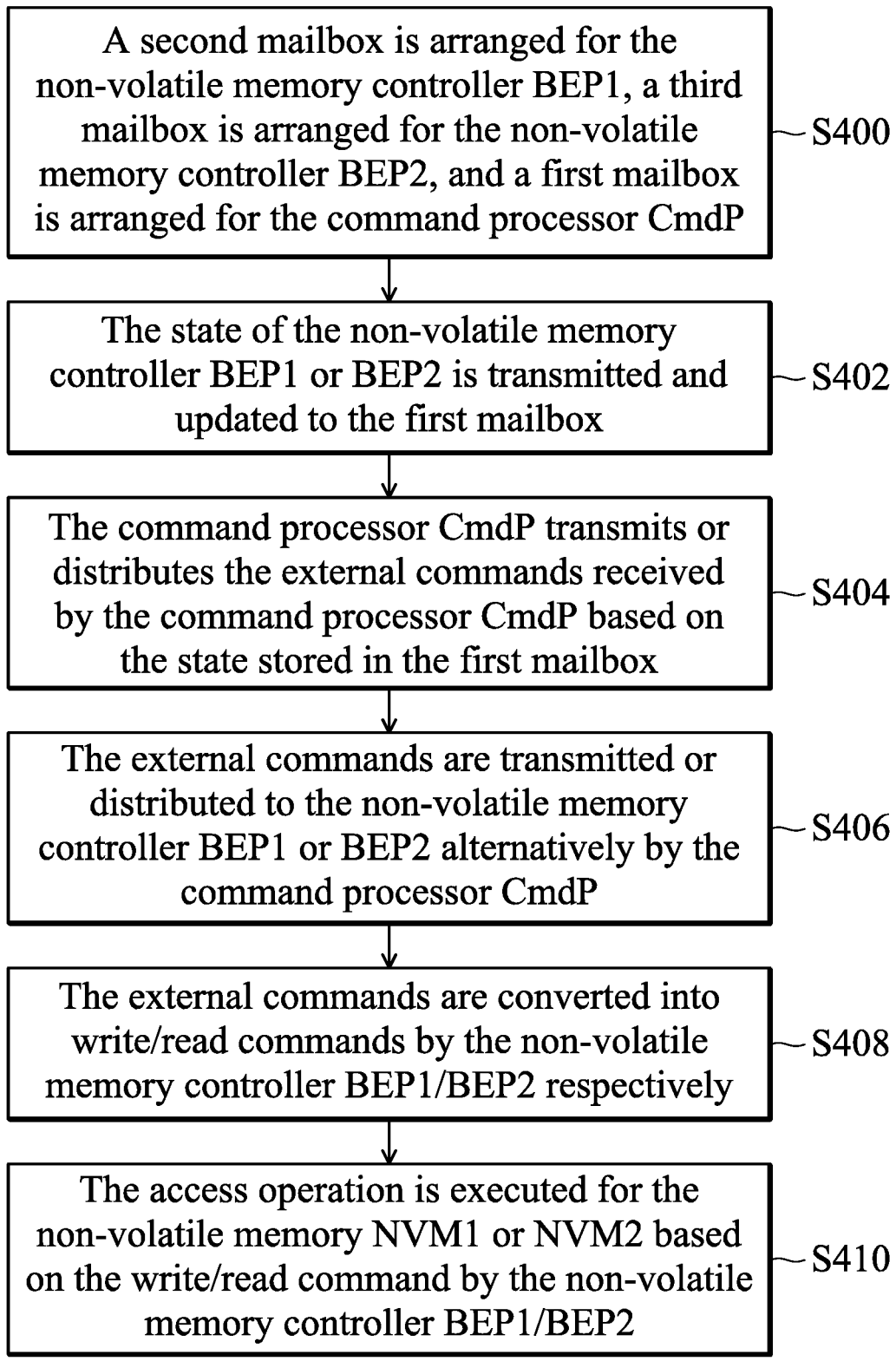
FIG. 4 is schematic illustrating a data storage method according to an embodiment of the invention.

FIG. 4 is schematic illustrating a data storage method according to an embodiment of the invention. In step S400, a second mailbox is arranged for the non-volatile memory controller BEP1, a third mailbox is arranged for the non-volatile memory controller BEP2, and a first mailbox is arranged for the command processor CmdP. In step S402, the state of the non-volatile memory controller BEP1 or BEP2 is transmitted and updated to the first mailbox. In step S404, the command processor CmdP transmits or distributes the external commands received by the command processor CmdP based on the state stored in the first mailbox. The external command is generated from the host 104 and complies with the NVMs standard. In addition, the external command is queued in the command processor CmdP before it is transmitted or distributed. The external commands are scheduled according to the setting of priority or the sequence of receiving. In step S406, the external commands are transmitted or distributed to the non-volatile memory controller BEP1 or BEP2 alternatively by the command processor CmdP. Afterwards, in step S408, the external commands are converted into read/write commands by the non-volatile memory controller BEP1/BEP2 respectively. In step S410, the access operation is executed for the non-volatile memory NVM1 or NVM2 based on the read/write command by the non-volatile memory controller BEP1/BEP2. The access operation is preferably executed for the non-volatile memory NVM1 or NVM2 through multi-channels by the non-volatile memory controller BEP1/BEP2.

Figure 5:
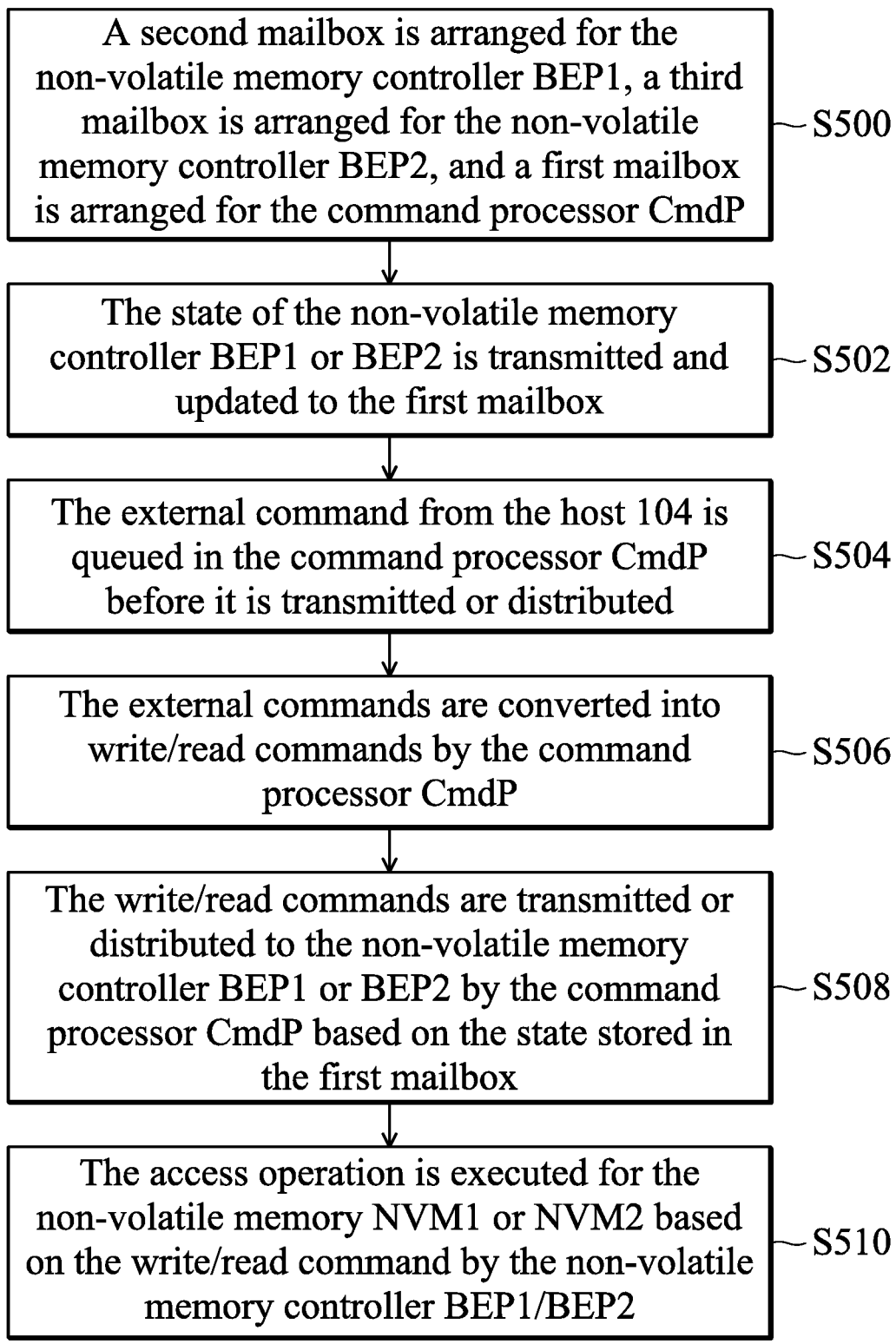
FIG. 5 is schematic illustrating a data storage method according to another embodiment of the invention.

FIG. 5 is schematic illustrating a data storage method according to another embodiment of the invention. In step S500, a second mailbox is arranged for the non-volatile memory controller BEP1, a third mailbox is arranged for the non-volatile memory controller BEP2, and a first mailbox is arranged for the command processor CmdP. In step S502, the state of the non-volatile memory controller BEP1 or BEP2 is transmitted and updated to the first mailbox. In step S504, the external command from the host 104 is queued in the command processor CmdP before it is transmitted or distributed. The external commands are scheduled by the command processor CmdP according to the setting of priority or the sequence of receiving. In step S506, the external commands are converted into read/write commands by the command processor CmdP. In step S508, the read/write commands are transmitted or distributed to the non-volatile memory controller BEP1 or BEP2 by the command processor CmdP based on the state stored in the first mailbox. In step S510, the access operation is executed for the non-volatile memory NVM1 or NVM2 based on the read/write command by the non-volatile memory controller BEP1/BEP2. The access operation is preferably executed for the non-volatile memory NVM1 or NVM2 through multi-channels by the non-volatile memory controller BEP1/BEP2.

Figure 6:
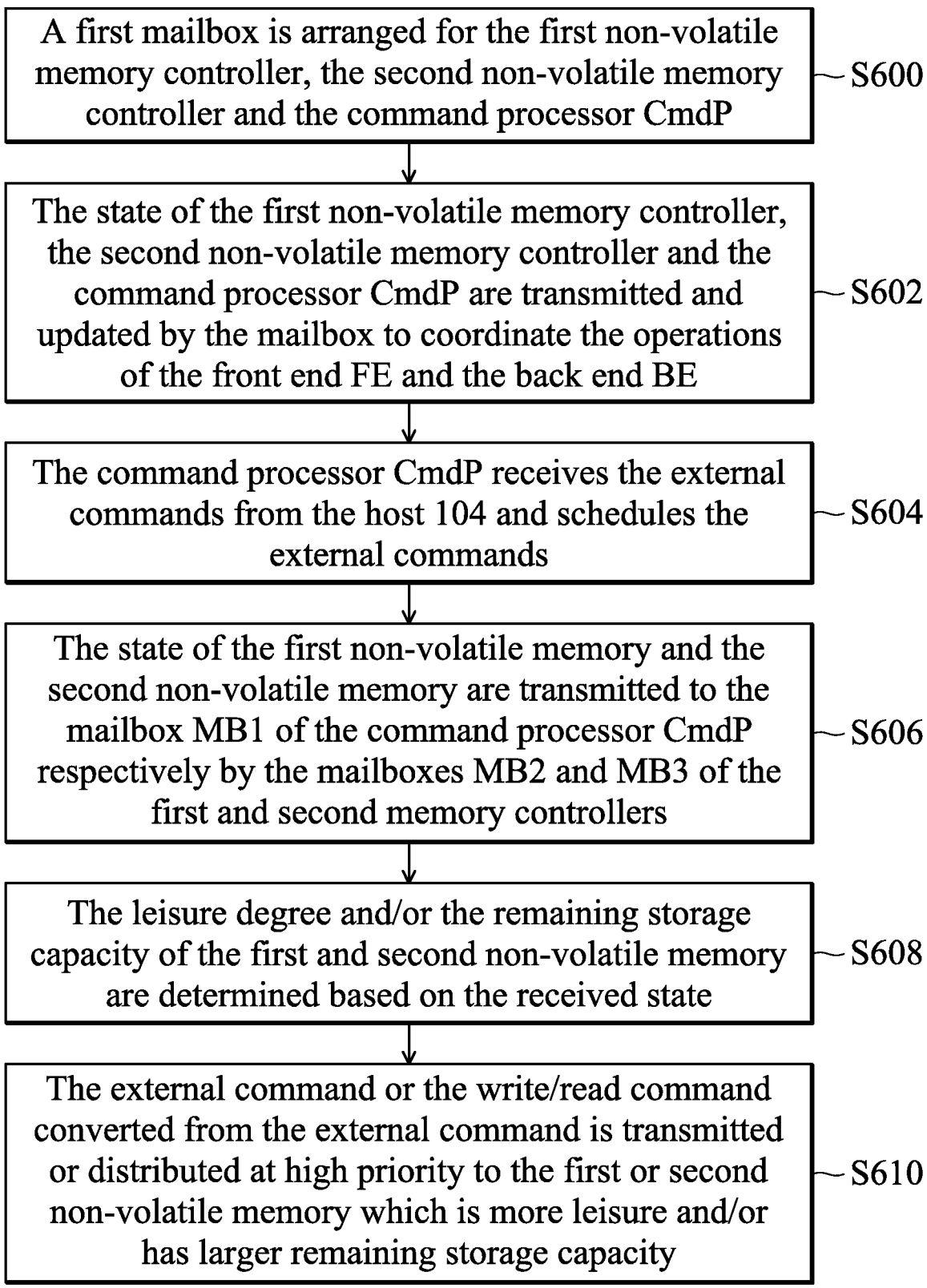
FIG. 6 is schematic illustrating a data storage method according to another embodiment of the invention.

FIG. 6 is schematic illustrating a data storage method according to another embodiment of the invention. In step S600, a first mailbox is arranged for the first non-volatile memory controller, the second non-volatile memory controller and the command processor CmdP. In step S602, the state of the first non-volatile memory controller, the second non-volatile memory controller and the command processor CmdP are transmitted and updated by the mailbox to coordinate the operations of the front end FE and the back end BE. In step S604, the command processor CmdP receives the external commands from the host 104 and schedules the external commands.

In step S606, The state of the first non-volatile memory and the second non-volatile memory are transmitted to the mailbox MB1 of the command processor CmdP respectively by the mailboxes MB2 and MB3 of the first and second memory controllers. In step S608, the leisure degree and/or the remaining storage capacity of the first and second non-volatile memory are determined based on the received state.

Afterwards, in step S610, the external command or the read/write command converted from the external command is transmitted or distributed at high priority to the first or second non-volatile memory which is more leisure and/or has larger remaining storage capacity. It should be noted that various data storage method shown in FIG. 4~6 could be implemented individually or combined in proper way to improve the expansion and read/write performance of the data storage device, which is not limited by the present invention.

Data transmission methods, or certain aspects or portions thereof, may take the form of a program code (i.e., executable commands) embodied in tangible media, such as floppy diskettes, CD-ROMS, hard drives, or any other machine-readable storage medium, wherein, when the program code is loaded into and executed by a machine such as a computer, the machine thereby becomes an apparatus for practicing the methods. The methods may also be embodied in the form of a program code transmitted over some transmission medium, such as electrical wiring or cabling, through fiber optics, or via any other form of transmission, wherein, when the program code is received and loaded into and executed by a machine such as a computer, the machine becomes an apparatus for practicing the disclosed methods. When implemented on a general-purpose processor, the program code combines with the processor to provide a unique apparatus that operates analogously to application-specific logic circuits.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:
1. A data storage device, comprising:
a non-volatile memory; and
a controller in a two-layer structure, wherein the two-layer structure comprises a front end coupled to a host and a back end coupled to the non-volatile memory, and the controller comprises:
a command processor, arranged in the front end to communicate with the host, scheduling operations of the data storage device according to an external command from the host; and
a non-volatile memory controller, arranged in the back end, controlling the non-volatile memory according to a schedule of the command processor, wherein the number of non-volatile memory is equal to the number of non-volatile memory controller, but the number of command processor is fixed when the number of non-volatile memory and the number of non-volatile memory controller increase;
wherein, the non-volatile memory comprises a first non-volatile memory, the non-volatile memory controller comprises a first non-volatile memory controller, the command processor comprises a first mailbox, the first non-volatile memory controller comprises a second mailbox, the second mailbox transmits and updates a first state of the first non-volatile memory controller to the first mailbox, and the command processor coordi- nates operations of the front end and the back end according to the first state in the first mailbox.

2. The data storage device as claimed in claim 1, wherein: a plurality of channels are arranged between the non-volatile memory and the non-volatile memory controller, the data which needs to be accessed is distributed uniformly to the channels by the non-volatile memory controller to perform writing or reading of the data with the non-volatile memory.

3. The data storage device as claimed in claim 1, wherein the controller further comprises:
a command protocol controller, arranged in the front end, utilized to support a command protocol of the data storage device and encrypt the data from the host.

4. The data storage device as claimed in claim 1, wherein: the non-volatile memory further comprises a second non-volatile memory, the non-volatile memory controller further comprises a second non-volatile memory controller, the second non-volatile memory controller comprises a third mail box, the third mail box transmits and updates a second state of the second non-volatile memory controller to the first mailbox, and the command processor further coordinates operations of the front end and the back end according to the first state and the second state in the first mailbox.

5. The data storage device as claimed in claim 4, wherein: the external commands are transmitted or distributed to the first non-volatile memory controller or the second non-volatile memory controller alternatively by the command processor.

6. The data storage device as claimed in claim 5, wherein: the first non-volatile memory controller or the second non-volatile memory controller converts the external command into a read/write command, and the first non-volatile memory controller or the second non-volatile memory controller performs an access operation on the first non-volatile memory or the second non-volatile memory based on the read/write command.

7. The data storage device as claimed in claim 4, wherein: the second mailbox and the third mailbox of the first non-volatile memory controller and the second non-volatile memory controller transmit the first state and the second state of the first non-volatile memory and the second non-volatile memory to the first mailbox of the command processor, and the first mailbox of the command processor determines leisure degree of the first non-volatile memory and the second non-volatile memory based on the first state and the second state in the first mailbox and transmits data to be written to the first non-volatile memory or the second non-volatile memory which is more leisure at high priority.

8. The data storage device as claimed in claim 4, wherein: the second mail mailbox and the third mailbox of the first non-volatile memory controller and the second non-volatile memory controller transmit the first state and the second state of the first non-volatile memory and the second non-volatile memory to the first mailbox of the command processor, and the first mailbox of the command processor determines remaining storage capacity of the first non-volatile memory and the second non-volatile memory based on the first state and the second state in the first mailbox and transmits data to be written to the first non-volatile memory or the second non-volatile memory which has the larger remaining storage capacity at high priority.

9. The data storage device as claimed in claim 4, wherein: the first non-volatile memory and the second non-volatile memory are a redundant array of independent disks (RAID).

10. The data storage device as claimed in claim 9, wherein: the first non-volatile memory and the second non-volatile memory are mirror mapping, and the data stored in the first non-volatile memory is identical to the data stored in the second non-volatile memory.

11. A data storage method, applied to a data storage device which comprises a non-volatile memory and a controller in a two-layer structure, wherein the two-layer structure comprises a front end coupled to a host and a back end coupled to the non-volatile memory, the data storage method comprising:
communicating with the host and scheduling operations of the data storage device according to an external command from the host by a command processor arranged in the front end; and
controlling the non-volatile memory according to a schedule of the command processor by a non-volatile memory controller arranged in the back end;
wherein, the number of non-volatile memory is equal to the number of non-volatile memory controller; and the number of command processor is fixed when the number of non-volatile memory and the number of non-volatile memory controller increase;
wherein, the non-volatile memory comprises a first non-volatile memory, the non-volatile memory controller comprises a first non-volatile memory controller, the command processor comprises a first mailbox, the first non-volatile memory controller comprises a second mailbox, the second mailbox transmits and updates a first state of the first non-volatile memory controller to the first mailbox, and the command processor coordinates operations of the front end and the back end according to the first state in the first mailbox.

12. The data storage method as claimed in claim 11, further comprising:
arranging a plurality of channels between the non-volatile memory and the non-volatile memory controller; and
uniformly distributing the data which needs to be accessed to the channels via the non-volatile memory controller to perform writing or reading of the data with the non-volatile memory.

13. The data storage method as claimed in claim 11, further comprising:
supporting a command protocol of the data storage device and encrypting the data from the host.

14. The data storage method as claimed in claim 11, wherein the non-volatile memory further comprises a second non-volatile memory and the non-volatile memory controller further comprises a second non-volatile memory controller, the data storage method further comprising:
arranging a third mailbox in the second non-volatile memory controller; and
transmitting and updating a second state of the second non-volatile memory controller to the first mailbox, such that the command processor to coordinates operations of the front end and the back end according to the first state and the second state in the first mailbox.

15. The data storage method as claimed in claim 14, further comprising:
transmitting or distributing the external commands to the first non-volatile memory controller or the second non-volatile memory controller alternatively.

16. The data storage method as claimed in claim 15, further comprising:

converting the external command into a read/write command by the first non-volatile memory controller or the second non-volatile memory controller; and performing an access operation on the first non-volatile memory or the second non-volatile memory using the first non-volatile memory controller or the second non-volatile memory controller based on the read/write command.

17. The data storage method as claimed in claim 14, further comprising:

transmitting the first state and the second state of the first non-volatile memory and the second non-volatile memory to the first mailbox of the command processor via the second mailbox and the third mailbox of the first non-volatile memory controller and the second non-volatile memory controller;

determining the leisure degree of the first non-volatile memory and the second non-volatile memory using the first mailbox of the command processor based on the first state and the second state in the first mailbox; and transmitting data to be written to the first non-volatile memory or the second non-volatile memory which is more leisure at high priority.

18. The data storage method as claimed in claim 14, further comprising:

transmitting the first state and the second state of the first non-volatile memory and the second non-volatile memory to the first mailbox of the command processor by the second mailbox and the third mailbox of the first non-volatile memory controller and the second non-volatile memory controller;

determining remaining storage capacity of the first non-volatile memory and the second non-volatile memory by the first mailbox of the command processor based on the first state and the second state in the first mailbox; and transmitting data to be written to the first non-volatile memory or the second non-volatile memory which has a larger remaining storage capacity at high priority.

\* \* \* \* \*